United States Patent [19]

Steinberg et al.

[11] Patent Number: 5,216,556
[45] Date of Patent: Jun. 1, 1993

[54] METHOD FOR OPTIMIZED TAPE TENSION ADJUSTMENT FOR A TAPE DRIVE

[75] Inventors: Mitchell R. Steinberg, Cambridge; George A. Saliba, Northboro, both of Mass.

[73] Assignee: Digital Equipment Corporation, Maynard, Mass.

[21] Appl. No.: 692,107

[22] Filed: Apr. 26, 1991

[51] Int. Cl.⁵ .................................................. G11B 15/43
[52] U.S. Cl. ..................................... 360/74.3; 360/71; 360/74.5; 242/189; 364/148
[58] Field of Search ............... 360/71, 74.3, 74.5; 242/189; 364/148

[56] References Cited

U.S. PATENT DOCUMENTS

| | | | |
|---|---|---|---|
| 3,633,187 | 1/1972 | Proctor | 360/25 |
| 3,781,490 | 12/1973 | Phillips | 360/71 |
| 3,947,880 | 3/1976 | Backers et al. | 360/71 |
| 4,389,600 | 6/1983 | Milligan et al. | 360/74.3 |
| 4,552,351 | 6/1985 | Yessian et al. | 241/3.1 |
| 4,656,530 | 4/1987 | Farrow et al. | 360/15 |
| 4,807,107 | 2/1989 | Fincher | 360/74.3 |
| 5,032,936 | 7/1991 | Fujioka et al. | 360/71 |
| 5,125,592 | 6/1992 | Sato | 242/189 |

Primary Examiner—John S. Heyman
Attorney, Agent, or Firm—John M. Gunther; Barry N. Young

[57] ABSTRACT

A method for adjusting the tension of a tape in a tape drive is disclosed. The tape is loaded into the tape drive. A test signal is then provided to record test information onto the tape while the tape tension is varied concurrently in a prescribed manner. The test information is read immediately to provide a test readback signal. The test readback signal is processed to determine a functional relationship between the test readback signal and the tape tension. An operating tape tension value is computed based upon the functional relationship. The operating tape tension is implemented on the tape drive in the form of a command signal to a motor means of the tape drive.

27 Claims, 6 Drawing Sheets

METHOD FOR OPTIMIZED TAPE TENSION ADJUSTMENT FOR A TAPE DRIVE

FIELD OF THE INVENTION

The invention relates to mass data storage devices and more particularly to a system for optimization of tape tension for magnetic tape drives.

BACKGROUND OF THE INVENTION

Magnetic tape drives are commonly used to provide significant data storage capacity and serve as an inexpensive alternative to disk drives whenever sequential data access is acceptable. Data is recorded inside a layer of ferromagnetic material deposited on a long strip of tape which is wound between two hubs and enclosed within a cartridge of appropriate dimensions. To perform data transfer to and from the tape, the cartridge is inserted into a tape drive bringing the tape into intimate contact with a read/write head. Data is recorded or accessed sequentially, according to a predetermined format, as the tape is advanced past the read/write head by means of a pair of motors, each coupled to one of the hubs, which act to maintain a desired tape speed. In addition, motion of the trailing motor is determined relative to the motion of the advance motor to provide the necessary tape tension for close contact between the tape and the head in order to obtain good data signal quality.

The need to maintain highly reliable data transfer requires good signal to noise ratio and, consequently, large amplitudes of the readback signal which is effected through a direct physical contact between the tape and the read/write head throughout the operation of the tape drive. The contact is obtained by tensioning the tape to conform to the contour of the read/write head. Thus tensioning is effected through appropriate simultaneous control of the respective speeds of the advance motor and the trailing motor. Weak tape tension can lead to unreliable contact and intermittent tape separation from the read/write head which reveals itself in the form of a low amplitude readback signal and poor data transfer reliability. Significantly overtensioning the tape, however, can lead to media loss due to plastic deformation of the tape base material. More commonly, slight excesses in tape tension over time lead to rapid read/write head wear, shortening the useful life of the tape drive.

In the past, tape tension has been controlled by such means as: feedback loops using tension sensors, vacuum columns, and/or mechanical tensioners. These methods have attempted to keep tape tension constant. However, these approaches do not account for variations in physical characteristics such as: tape dimensions and properties, mechanical variations in the tape drive mechanism, and contour of the read/write head. Since direct tape to head contact produces frictional wear of the head material, appreciable changes in the head geometry occur over time. As a result, tape tension values which were optimal at the outset no longer provide adequate conformance of the tape to the changing head contour with consequent loss in the data signal quality and tape drive reliability due to higher data error rates.

An additional difficulty experienced with tape drive tension determination occurred whenever a variety of tapes were used on the same drive over a range of operating conditions. Elastic properties of the tape can be expected to change over time, dependent upon environmental effects such as temperature and ambient humidity as well as with extended use. Moreover, tape properties, such as tape thickness, elasticity and magnetic characteristics, vary across production lots and from one tape product to another. With the previous methods of tape tension control, the tape drive operation over a range of ambient conditions, e.g. temperature, humidity, variation of motor constants, and tape characteristics, resulted in less reliable data transfer, limiting the scope of potential drive applications.

It is desired to have a method of adjusting the tape tension to adapt to variations in the tape drive physical characteristics as well as environmental conditions.

SUMMARY OF THE INVENTION

The invention is a method for adaptively adjusting the tape tension in a tape drive system. The tape tension is optimized to account for variations in the physical characteristics of the tape and the tape drive components as well as the operating conditions. Each time a tape cartridge is loaded into the tape drive, the system undergoes a tension optimization procedure. A designated scratch area on the surface of the tape is erased as the tape is advanced in the forward and then in the backward direction. A test signal of fixed, known characteristics is next provided to record test information on the tape. While the test signal is being recorded, tape tension is gradually increased in a linear manner with a sinusoidal disturbance superimposed on the ramp. Recording the test signal with fixed characteristics, provides a convenient measure for comparing readback signal amplitudes obtained at different tape tension values. The output of the read head is sampled in real time at a known frequency and the samples are stored in a microprocessor memory as a table of tape tension versus read head output. The test signal samples are further processed through a digital filter. The result of the filtering step is stored back in the table in the microprocessor memory. A search through the table is performed to locate the maximum readback signal amplitude. Next, an optimal tape tension is derived based on the maximum readback signal amplitude. This tape tension value is implemented in the form of appropriate command signals to the motors of the tape drive. An analogous tape tension adjustment procedure is then performed with the tape moving in the backward direction and the corresponding value of the optimal tape tension is obtained for subsequent use.

A more detailed understanding of the invention may be had from the following description of the preferred embodiments, given by way of example, to be read in conjunction with the accompanying drawings, wherein

DETAILED DESCRIPTION

Figure 1:
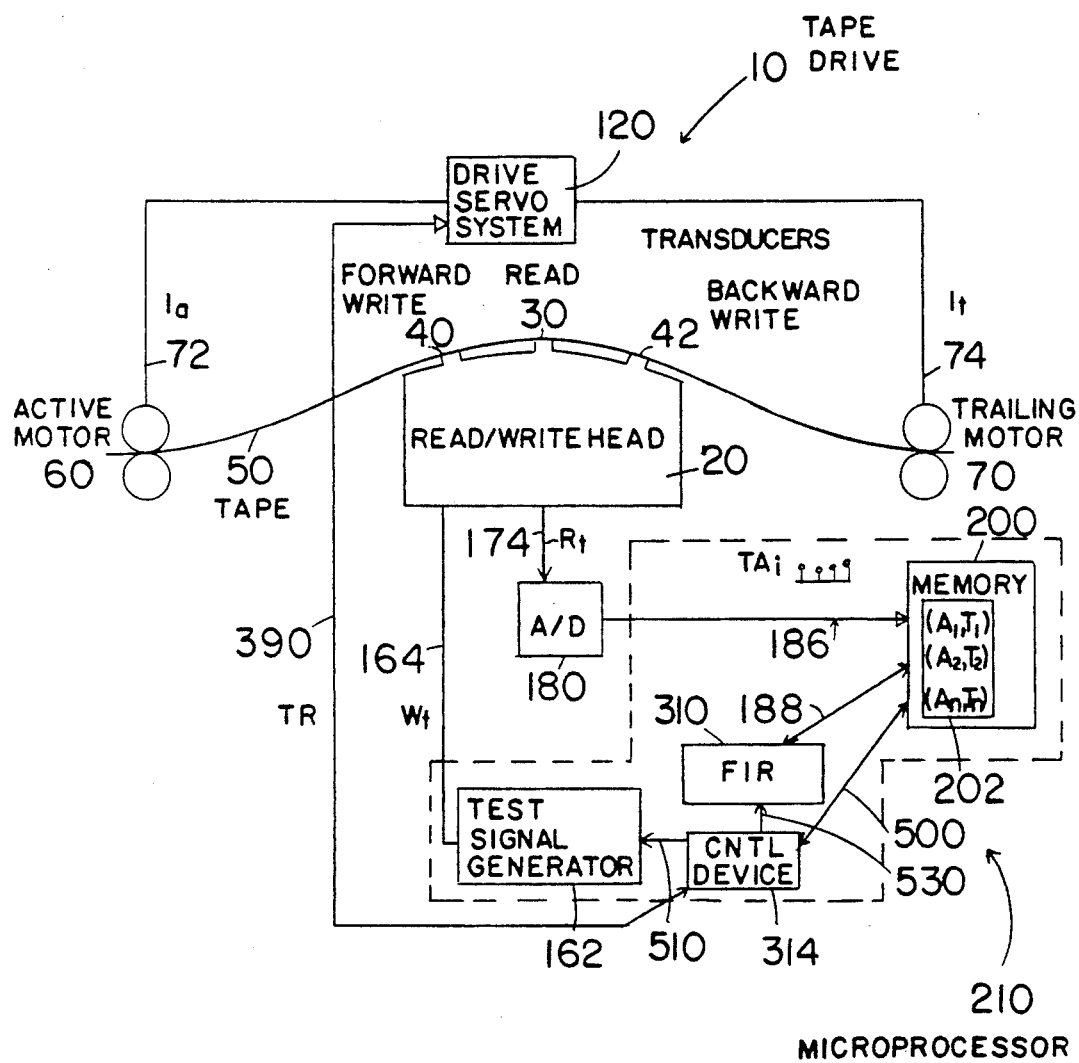
FIG. 1 is a schematic diagram of the tape tension adjustment system, according to the invention.

Referring now to the drawings, and in particular to FIG. 1, there is shown a portion of a tape drive 10 which includes, inter alia, a read/write head 20 provided with a read transducer 30, a forward write transducer 40, and a backward write transducer 42, the write transducers being disposed substantially symmetrically on either side of read transducer 30. To enable simultaneous write and read operations, forward write transducer 40 is located anterior to read head 30 in order to make the data magnetically encoded on the surface of a tape 50 instantly available for reading when tape 50 is advanced in the forward direction. The disposition of backward write transducer 42 posterior to read transducer 30 is similarly intended to accommodate the simultaneous write and read operation when tape 50 is moved in the opposite direction.

As can be seen in FIG. 1, the read and write transducers are spatially disposed on read/write head 20 along a convex surface which is offset from a straight line between the drive rollers of a first or advance motor 60 and a second or trailing motor 70 whereby tape 50 is subjected to tension by being compelled to follow the contour of read/write head 20. If the tape tension is kept constant over many operation cycles, gradual wear of read/write head 20 will eventually result in inadequate head to tape contact and detrimentally affect the readback signal amplitude. The purpose of the invention is to adapt the tape tension to the changing physical characteristics of the read/write head.

The data is written onto tape 50 in accordance with a pre-specified format as tape 50 is moved past read/write head 20 by means of a motor pair consisting of an advance motor 60 and a trailing motor 70. A first output terminal of a drive servo system 120 is coupled to an input terminal of advance motor 60 via line 72 to supply a current command $I_a$. A second output terminal of drive servo system 120 is coupled to an input terminal of trailing motor 70 via line 74 to supply a current command $I_t$.

Block 162 in FIG. 1 is a test signal generator whose output terminal is coupled to an input terminal of read/write head 20 via line 164. An output terminal of read/write head 20 is coupled to an input terminal of an analog to digital converter 180 (designated A/D) via line 174. A/D 180 is used to sample, hold, and digitize an analog test readback signal $R_t$ from read transducer 30. The test amplitude samples $TA_i$ at the output terminal of A/D 180 on line 186 are stored as readback amplitude values $A_i$ in a table 202 located inside a memory 200. A finite impulse response filter contained in block 310 (designated FIR) interacts with memory 200 via line 188 to further process the readback amplitude values $A_i$ stored in table 202 and write them back into the memory as described below in greater detail.

Block 314 is a control device whose first output terminal is coupled to a second input terminal of memory 200 via line 500, second output terminal is coupled to an input terminal of test signal generator 162 via line 510, third output terminal is coupled to an input terminal of FIR via line 530. In addition, control device 314 interacts with drive servo system 120 via line 390. Control device 314 is responsible for controlling and coordinating the sequence of operations of all the blocks inside a microprocessor 210, delineated by a dashed line in FIG. 1. Although block 314 has been designated a control device, it will be understood that the control functions are effected by microprocessor commands via appropriate hardware and software. The purpose of the various blocks is described in greater detail below.

The current commands $I_a$ and $I_t$ are generated by drive servo system 120 of tape drive 10 as a result of computations which are updated at regular intervals and are based upon the desired tape tension, speed, and relevant tape drive parameters. For example, to provide the tape tension sufficient for good head to tape contact and an adequate readback signal amplitude with tape 50 moving in the forward direction, current command $I_a$ is produced to acquire and maintain a desired tape speed by imparting an appropriate rotational speed to advance motor 60. At the same time, current command $I_t$ supplied to trailing motor 70 is such as to support the desired tape speed as well as induce the necessary tape tension in the segment of tape 50 located between the two motors and in contact with read/write head 20. A test signal appearing on line 164 is supplied to write transducers of read/write head 20 during the tape optimization procedure described in greater detail below.

Figure 2:
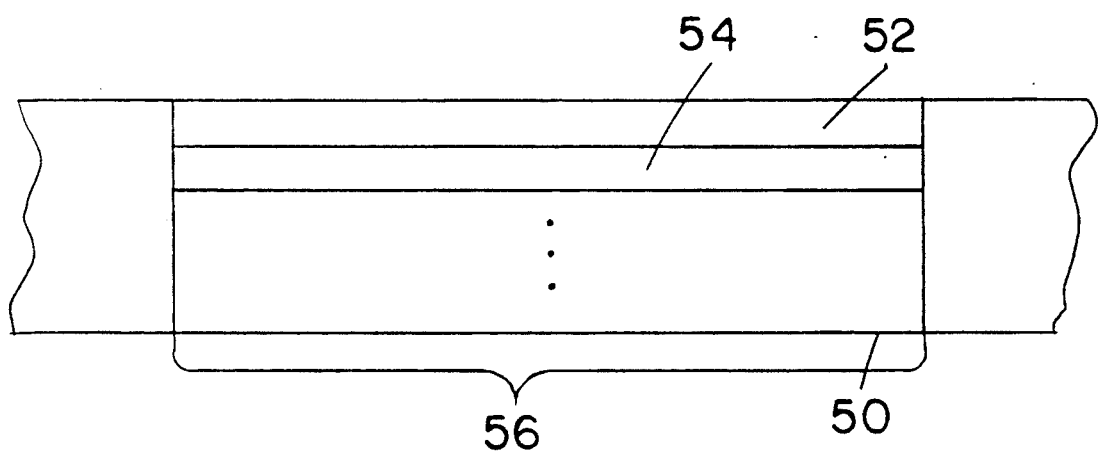
FIG. 2 is a segment of the tape depicting a multiple track scratch area.
Figure 3:
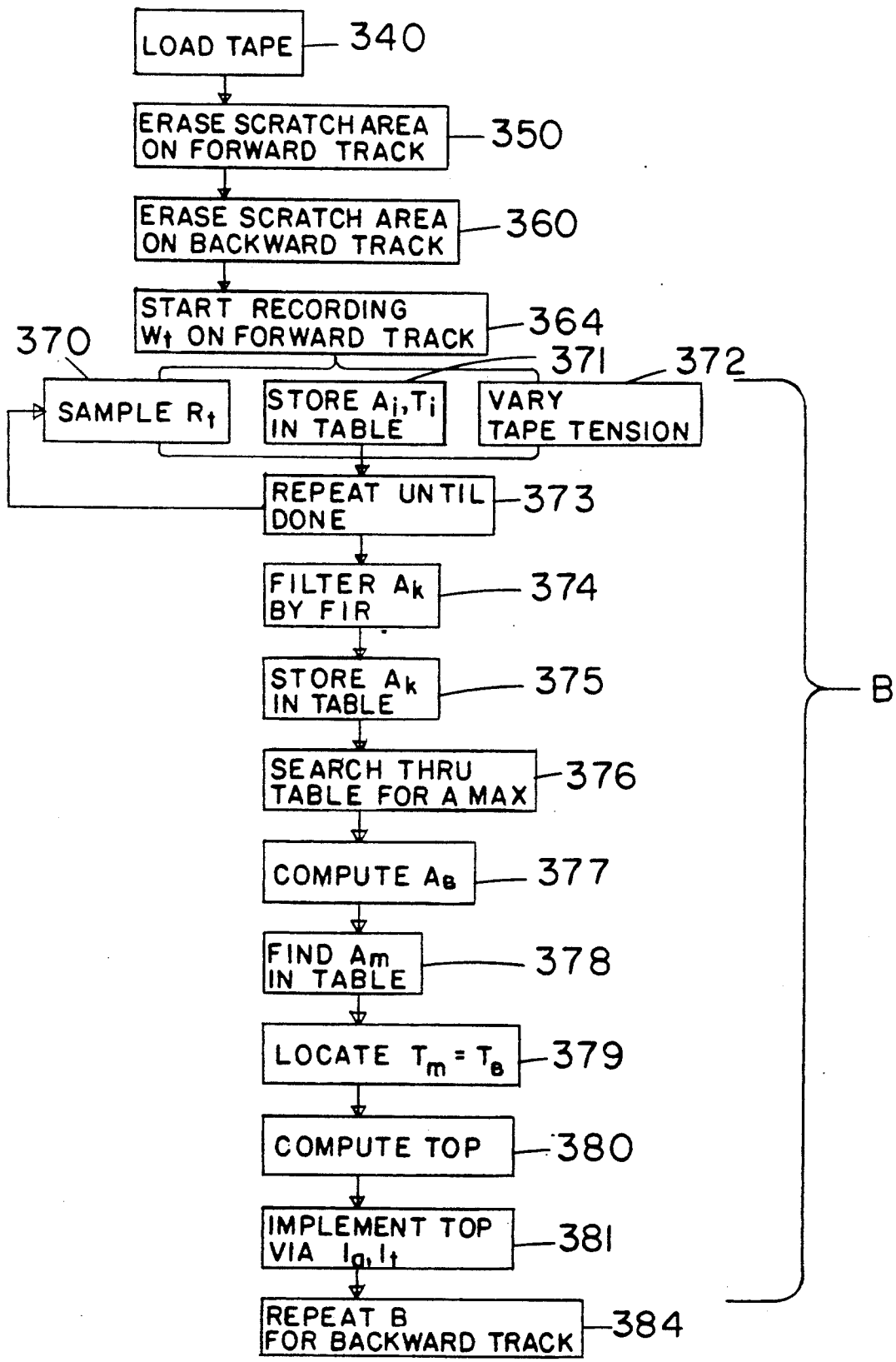
FIG. 3 is a flow chart of the tape tension optimization procedure.

Referring to FIGS. 2 and 3, the adjustment of tape tension, according to the invention, is performed each time a new tape cartridge is loaded into tape drive 10, depicted as step 340 in FIG. 3. Tape 50 is positioned at the beginning of a segment designated as a scratch area 56, shown in FIG. 2, which is first erased through the data erasure step 350 with a pre-selected write signal recorded by forward write transducer 40 along a forward track 52 (FIG. 2) on the surface of tape 50 as the tape is moved forward. Once the end of the scratch area is reached along forward track 52, step 360 is initiated whereby read/write head 30 (FIG. 1) is positioned into alignment with a backward track 54 and backward write transducer 42 (FIG. 1) is used to erase the track as tape 50 is moved in the backward direction.

Figure 4:
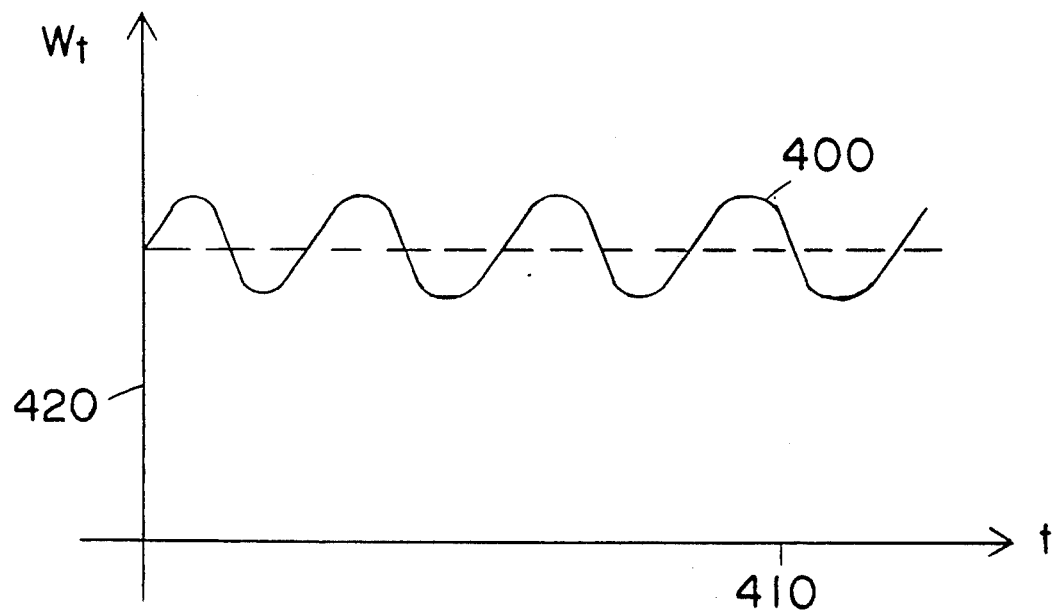
FIG. 4 is a history of the test signal written to the tape during tape tension optimization.

In the following step 364, read/write head 20 is repositioned over forward track 52 and a test signal $W_t$, shown in FIG. 4 by line 400 with a horizontal axis 410 and a vertical axis 420 denoting time and the amplitude of test signal $W_t$, respectively is recorded in scratch area 56 of tape 50. The test signal $W_t$ is a current signal of known parameters, such as a fixed frequency and amplitude, applied by test signal generator 162 on line 164 (FIG. 1) to forward write head 40. The gain of forward write head 40 is held constant throughout the tape tension optimization procedure.

Referring again to FIG. 1, while the test signal $W_t$ is being recorded, control device 314 inside microprocessor 210 transmits a tape tension request TR via line 390 to drive servo system 120 for effecting control of advance motor 60 and trailing motor 70, whereby tape 50 is subjected to a gradual increase in tension. This is depicted in FIG. 5 where, in accordance with the invention, the tape tension signal $T_t$ is defined by line 190 while the horizontal axis and the vertical axis denote time and tape tension, respectively.

Referring again to FIG. 1, control device 314 supplies the desired value of tape tension $T_i$ ($i=0,1,2$ ...) in the form of the tape tension request TR to drive servo system 120 via line 390. Drive servo system 120 uses the desired tape tension value $T_i$ along with a number of the tape drive parameters as inputs into a periodically repeated sequence of predetermined computations to update the current commands $I_a$ and $I_t$ supplied to advance motor 60 via line 72 and trailing motor 70 via line 74 accordingly. Once the desired tape tension value $T_i$ has been realized through the appropriate current commands $I_a$ and $I_t$, the test readback signal $R_t$ appears at the output terminal of read transducer 30 on line 174. The test readback signal $R_t$ is then sampled by A/D 180 to produce the test amplitude samples $TA_i$ on line 186. The test amplitude samples $TA_i$ are next stored as readback amplitude values $A_i$ in table 202 inside memory 200. This puts each tape tension value $T_i$ and the corresponding readback amplitude value $A_i$ of the test readback signal $R_t$ into a one-to-one relationship.

Figure 5:
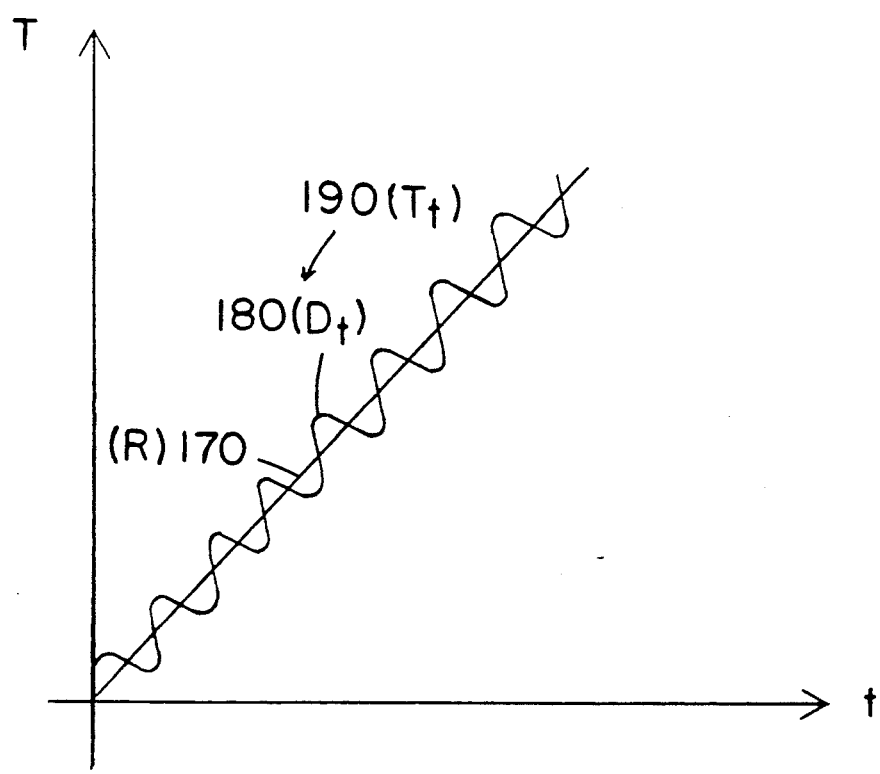
FIG. 5 is tape tension signal history for operating tape tension determination.

The tape tension signal $T_t$ is preferably composed of a ramp R, as depicted by line 170 in FIG. 5, modulated by a periodic test disturbance $D_t$ given by line 180, obeying, for example, a sinusoidal law, to emulate tape-read/write head separation condition. When the tape-read/write head separation occurs, tape 50, while being advanced during the data transfer operation, intermittently loses contact with read/write head 20 (FIG. 1). Such tape-read/write head separation condition is detrimental to the tape drive operation leading to instantaneous reduction in the amplitude of the test readback signal $R_t$ which results in lower signal to noise ratio and increased data error rates. The test disturbance $D_t$ whose frequency content is preferably chosen to coincide with one or more frequencies of the disturbances experienced by tape drive 10 in actual operation, is injected to reproduce the adverse effect of tape-read/write head separation on the tape drive operation.

Referring back to FIGS. 2 and 3, while the recording of the test signal $W_t$ in scratch area 56 of forward track 52 continues, steps 370 through 373 depicted in the flow chart of FIG. 3 are performed. In step 370 the test readback signal $R_t$ is sampled and digitized by A/D 180 (FIG. 1) to generate the test amplitude samples $TA_i$. In step 371, the readback amplitude values $A_i$ ($i = 0, 1, 2 \ldots$) corresponding to each test amplitude sample $TA_i$ are collected at a predetermined sampling frequency $f_s$. Each readback amplitude value $A_i$ and the corresponding desired tape tension value $T_i$ forms a pair of values which is then stored in table 202. In step 372 the tape tension is varied as described in greater detail below. In step 373 the steps 370 through 372 are repeated until the desired number of the test amplitude samples $TA_i$ is collected.

Figure 6:
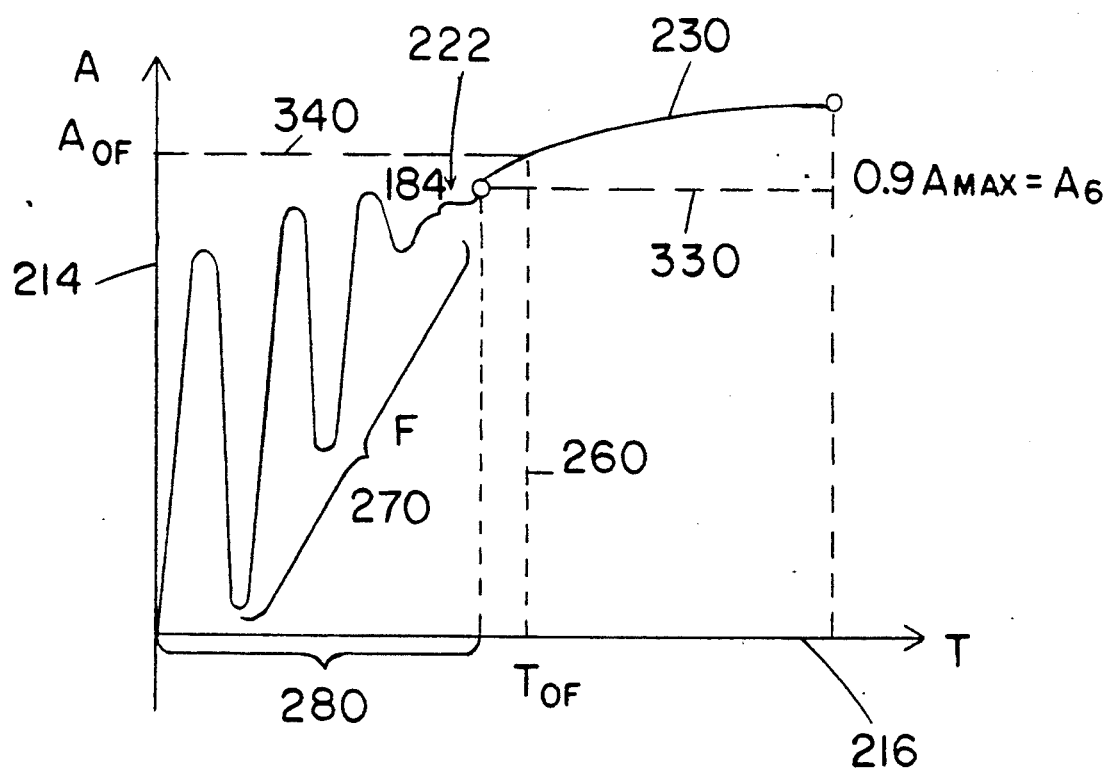
FIG. 6 is a readback signal amplitude versus tape tension plot in response to a tape tension signal containing a disturbance of pre-determined frequency.

Each pair of a readback signal amplitude value $A_i$ and a corresponding tape tension value $T_i$ representing an entry in table 202 may be plotted as shown in FIG. 6. In FIG. 6 the vertical axis 214 denotes the readback signal amplitude A and the horizontal axis 216 denotes the tape tension T. Relating the tape tension values $T_i$ to the actually observed readback amplitude values $A_i$ advantageously allows adjustment of the tape tension T to be performed independently of the physical characteristics of the advance and trailing motors 60, 70 in the tape drive 10. This allows tape drive 10 to become less sensitive to physical variations in such characteristics as ambient temperature, humidity, read/write head wear.

Figure 7:
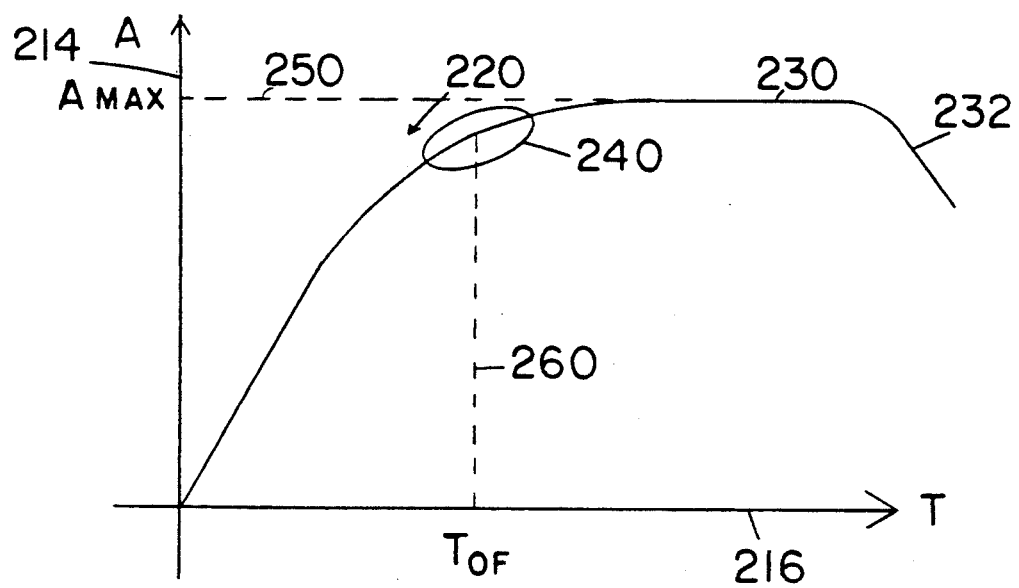
FIG. 7 is an ideal readback signal amplitude versus tape tension plot in response to tape tension signal.

Ideally, dependency of the readback signal amplitude A on the tape tension T may be expressed in the form of a graph 220 shown in FIG. 7. Initially, greater tape tension T results in an increase in readback signal amplitude A. As the tape tension T continues to rise, the rate of growth in the readback signal amplitude A declines eventually approaching zero so that a plateau region given by a line segment 230 is attained. In the plateau region 230 no readback signal amplitude changes occur in response to further tape tension increase. As the tape tension T continues to rise further, a readback amplitude breakdown region 232 may be reached. In the readback amplitude breakdown 232, the readback signal amplitude A undergoes a decrease in response to an increase to the tape tension T. This decrease in the readback signal amplitude A may be due to excessive deformation of the tape material or poor head to tape contact due to tape distortion.

In order to reduce tape wear, it is desirable to maintain the tape tension T sufficient for the readback signal amplitude A to equal to, or approximate, a maximum readback amplitude $A_{max}$, defined by the intersection of line 250 with graph 220, and yet ensure the lowest possible friction between tape 50 and read/write head 20 (FIG. 1) to extend the useful life of tape drive 10. According to the preferred embodiment of the invention, an optimal tape tension $T_{of}$ which best satisfies the two competing objectives with tape 50 moving forward is given by the intersection of line 260 and graph 220 which falls within the region of a knee 240 of graph 220. The optimal tape tension $T_{of}$ is selected each time tape 50 (FIG. 1) is loaded to account for head contour variation over time and to preclude overtensioning the tape. This advantageously leads to reduced tape and read/write head wear and lower error rates thus significantly extending the useful life of the tape 50. Moreover, adequate tape tension prevents intermittent separation of the tape 50 from the read/write head 20 (FIG. 1). Tape-read/write head separation may be caused by insufficient tape tension T and is undesirable because it results in unacceptable fluctuations in the readback signal amplitude A.

FIG. 6 depicts a modified embodiment of the invention, in which the tape tension $T_t$ contains a test disturbance $D_t$ which is intended to induce tape-read/write head separation. The resultant readback signal amplitude A exhibits fluctuations F given by the line segment 270 in a low tape tension region defined by the interval 280. Unlike the periodical nature of the test disturbance $D_t$ superimposed on the tape tension $T_t$, the fluctuations F in the readback signal amplitude A decay as the tape tension T rises to establish a sufficiently tight contact between tape 50 and read/write head 20 (FIG. 1).

Figure 8:
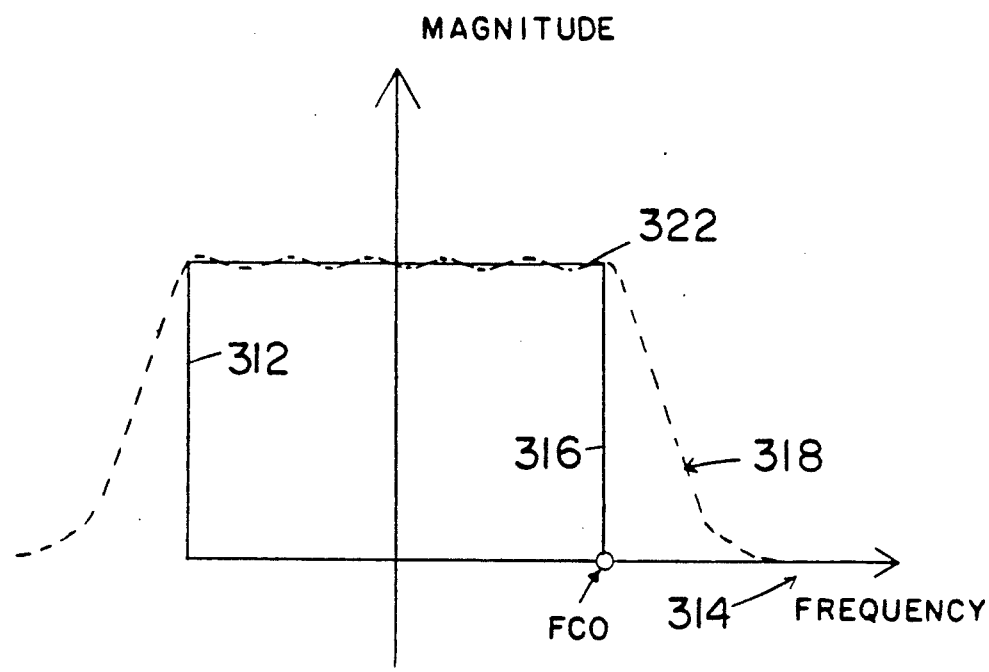
FIG. 8 is a magnitude frequency response plot of an ideal low pass filter and its least squares approximation.

Referring again to FIG. 1, the information relating the readback amplitude value $A_i$ to the tape tension value $T_i$, which are stored as a pair of values in table 202 inside memory 200, should be further limited to frequencies below the frequency of the test disturbance $D_t$. The readback amplitude values $A_i$ are extracted from memory 200 for subsequent processing during step 374 shown in FIG. 3. In accordance with the preferred embodiment of the invention, each readback amplitude value $A_i$ is processed through the finite impulse response filter (FIR) 310. FIG. 8, where the horizontal axis represents frequency and the vertical axis denotes magnitude, shows an example of the magnitude frequency response of FIR 310. The magnitude frequency response of FIR 310 is given by line 318 approximating, for example in a least squares sense, an ideal low pass filter response depicted by line 322 with a desired cutoff frequency $f_{co}$ given by the intersection of lines 314 and 316, as shown in FIG. 8. FIR 310 is generally characterized by a finite impulse response which is symmetrical with respect to its central sample as required for a linear phase response. Since the readback amplitude values $A_i$ are stored in memory 200 off line, band limiting filtering of the readback amplitude values $A_i$ can be performed in a non-causal manner. A finite weighted sum of the readback amplitude values $A_i$ is used to generate each present sample $A_{fil}(k)$ in accordance with the equation:

$$A_{fil}(k) = b_{-m}A(k-m) + b_{-m+1}A(k-m+1) + \ldots + b_{-1}A(k-1) + b_0A(k) + b_{+1}A(k+1) + \ldots$$

where $b_k$ are constant filter coefficients, $A(k)$ are the respective readback signal samples, and $(2m+1)$ is the filter order, for all k.

Since such non-causal filtering does not shift the readback signal sequence 284 in time, each sample $A(k)$ depicted by line 300, after being processed is in phase with its corresponding tape tension value $T_k$. The readback amplitude value $A_k^{fil}$ given by the filtered sample $A_{fil}(k)$ is thus stored in the original location in table 202 inside memory 200 during step 375 of the tape tension optimization procedure.

Once the filtered readback signal samples are restored into table 202, microprocessor 200 performs step 376 by executing a search through the readback amplitude values $A_i$ in table 202 in order to determine a reference value of readback signal amplitude $A_{ref}$, for example the maximum readback signal amplitude $A_{max}$. A base amplitude value $A_b$, given by the intersection of line 330 and graph 222 in FIG. 6, which is equal, for example, to ninety percent of maximum readback signal amplitude $A_{max}$, is computed by control device 314 (FIG. 1) during the next step 377. A backward search through table 202 is performed in step 378 starting with the last readback amplitude value $A_1$ until the maximum readback amplitude value $A_{max}$ is found. The search through table 202 then continues until a matching readback amplitude value $A_m$ resident in table 202 which is equal to the base amplitude value $A_b$ is found. If no such value exists, the nearest readback amplitude value $A_i$ is located in table 202, for example the value immediately below or above the base amplitude value $A_b$ within a predetermined range. In accordance with step 379 of the preferred embodiment of the invention, the corresponding tape tension value $T_m$ in table 202 is located to form a base tape tension value $T_b$. In step 380 a pre-selected offset is added to the base tape tension value $T_b$, for example 3 ounce-force, to compute an operating tape tension value $T_{op}$ which is optimal for tape drive 10. The value of the pre-selected offset which is used to obtain the operating tape tension value $T_{op}$ from the base tape tension value $T_b$ may be either a positive or a negative value. To implement the operating tape tension value, $T_{op}$ is communicated by control device 314 to drive servo system 120 via line 390 in step 381. The appropriate schedule of the motor drive current commands $I_a$ and $I_t$ is computed to realize the operating tape tension $T_{op}$.

Briefly, the above described steps of determining the operating tape tension $T_{op}$ may be summarized as follows. First, a search through table 202 is performed to locate the reference amplitude value, such as the maximum readback signal amplitude $A_{max}$. Second, the base amplitude value $A_b$, equal to a predetermined percentage of the maximum readback signal amplitude $A_{max}$, is computed. Third, table 202 is searched backwards until the maximum readback signal amplitude $A_{max}$ is found. The search continues until a matching readback amplitude value $A_m$ nearest the base amplitude $A_b$ is found. Fourth, the corresponding tape tension value $T_m$ is located in table 202 to form the base tape tension value $T_b$. Finally, a pre-selected offset is added to the base tape tension value $T_b$ to form the operating tape tension value $T_{op}$ which is implemented in the form of the appropriate current commands $I_a$ and $I_t$.

A procedure completely analogous to that used in determining the forward operating tape tension $T_{op}$ tape tension calibration, following steps 370-381 and denoted by bracket B in FIG. 3, is performed to obtain an optimal tape tension $T_{ob}$ with the direction of tape 50 reversed and read/write head 20 in alignment with backward track 54.

The tape adjustment procedure of the invention is easily adaptable for use in a multiple read channel tape drive configuration. The tape tension calibration is repeated for each group of forward and backward tracks. Since tape to head contact may vary from track to track, a preferred method of tape tension optimization is to select the operating tape tension value in each direction of tape motion based on the channel exhibiting the worst tape to head contact properties.

Figure 9:
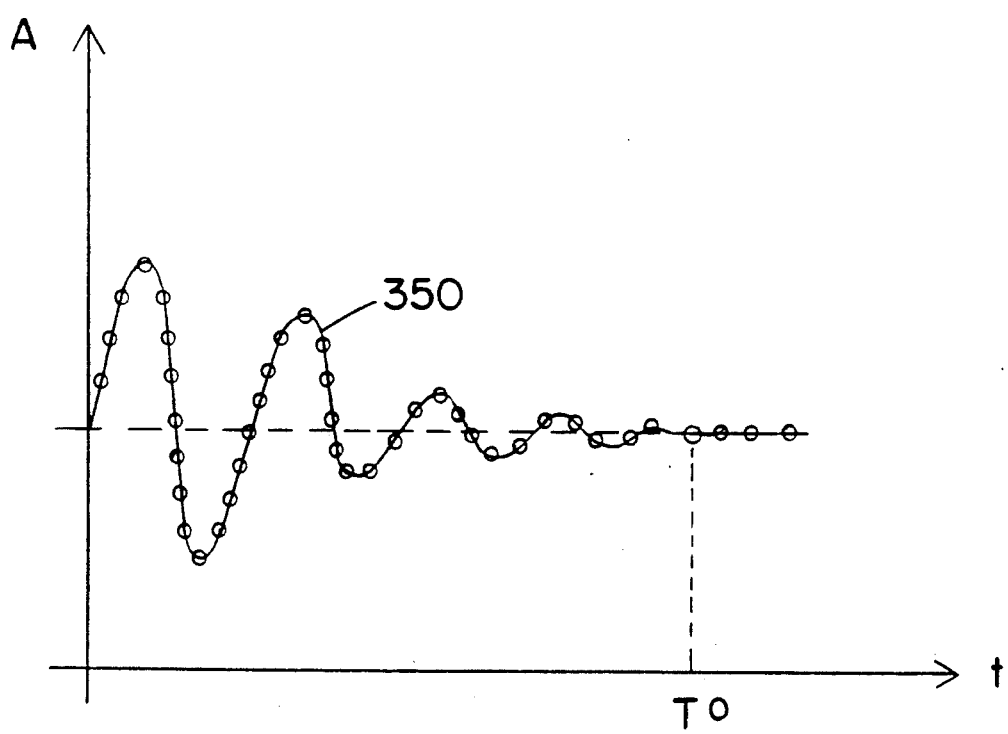
FIG. 9 is a band passed graph of the readback signal amplitude versus the tape tension.

According to a modified embodiment of the invention, the readback signal sequence 284 is additionally processed by a band pass digital filter in order to isolate the dependency of the readback signal amplitude A on the tape tension T within the frequency range of the test disturbance $D_t$ thereby facilitating the selection of the optimal tape tension $T_o$ for acceptably low fluctuation in the readback signal amplitude A. Such information, depicted by line 350 in FIG. 9, is stored in a separate table in memory 200 and is used in conjunction with table 202 to determine the optimal tape tension $T_o$.

In another embodiment of the invention, the tape tension adjustment procedure detailed in the preferred embodiment is performed while tape drive 10 is in operation following the receipt of a calibration command issued by control device 314 whenever a quality indicator of the readback signal, such as its signal to noise ratio, becomes unacceptable. A different tape tension may be required, for example, if the ambient conditions change while the tape data transfer operation is in progress. If the data error rates become excessively high, data transfer operation may be temporarily halted and the tape tension readjusted to the required level.

The tape tension adjustment, in accordance with the invention, advantageously permits the use of the same tape drive in conjunction with a variety of tape cartridges requiring different tensioning for proper data transfer operation because the optimal tape tension value is determined individually for each tape.

The foregoing description of the preferred embodiments is offered solely by way of illustration of the underlying principles of the invention. Many changes, modifications, and variations apparent to those skilled in the art will suggest themselves and are to be taken as embraced within the spirit and the scope of the appended claims.

We claim:

1. A method for adjusting the tension of a tape in a tape drive, the method comprising the steps of:
   loading the tape into the tape drive;
   providing a test signal;
   recording test information from the test signal onto the tape while tape tension is concurrently varied in value in a prescribed manner;
   immediately reading the test information to obtain a test readback signal;

processing the test readback signal to determine a functional relationship between the test readback signal and the tape tension;

computing the value of an operating tape tension based upon the functional relationship between the test readback signal and the tape tension; and implementing the operating tape tension in the form of a command signal to motor means of the tape drive.

2. The method of claim 1 further including the step of preparing a designated scratch area on the tape prior to recording the test signal.

3. The method of claim 2 wherein the step of preparing the designated scratch area on the surface of the tape comprises erasure of data in the scratch area by a predetermined write signal.

4. The method of claim 1 wherein the test signal is a signal of fixed parameters and the step of recording the test information includes:

varying the tape tension as a function of time.

5. The method of claim 4 wherein varying the tape tension includes increasing the tape tension as a linear function of time.

6. The method of claim 5 wherein a periodic disturbance of the tape tension is superimposed on the linear function of time.

7. A method for providing drive signals to first and second motor means of a tape drive for adjusting the tape tension to compensate for changes in ambient conditions as well as variation in physical and functional characteristics of the tape drive and the tape, the method comprising the steps of:

loading a tape into the tape drive;

preparing a designated scratch area on the tape by erasing the designated scratch area on a first track with a pre-selected write signal by means of a forward write transducer while the tape is moving in the forward direction;

upon reaching the end of the scratch area, reversing the direction of the tape motion and erasing the designated scratch area on a second track with a pre-selected write signal by means of a backward write transducer;

providing a test signal of known parameters for recording test information onto the scratch area of the first track with the tape moving in the forward direction while concurrently varying the tape tension in a predetermined manner by supplying appropriate current commands to the first motor means and the second motor means;

immediately reading the thus recorded test information for obtaining a test readback signal by means of a read transducer;

sampling the test readback signal;

processing the samples of the test readback signal to generate a table of the readback amplitude values versus the tape tension values;

determining a reference readback signal amplitude value;

determining an operating tape tension value with reference to the thus determined reference readback signal amplitude value; and controlling the current commands to the first motor means and the second motor means in response to the thus determined operating tape tension value for controlling the tape tension in the tape drive.

8. The method of claim 7 wherein the step of determining the reference readback signal amplitude value further comprises:

searching through the table of the readback amplitude values versus the tape tension values to determine the maximum readback signal amplitude;

calculating a base amplitude value equal to a predetermined portion of the maximum readback signal amplitude; and finding a readback amplitude value in the table matching the base amplitude value.

9. The method of claim 8 wherein the base amplitude value is within a predetermined percentage range of the maximum readback signal amplitude.

10. The method of claim 8 wherein the base amplitude value is about ninety percent of the maximum readback signal amplitude.

11. The method of claim 8 wherein the step of determining the operating tape tension value further includes:

locating within the table of the readback amplitude values versus the tape tension values a base tape tension value corresponding to the readback amplitude value matching the base amplitude value; and adding a predetermined offset to the base tape tension value to determine the operating tape tension value.

12. The method of claim 11 wherein the predetermined offset to the base tape tension is about 3 ounce-force.

13. The method of claim 7 wherein the step of processing the samples of the test readback signal further comprises:

storing the samples of the test readback signal in the table inside a memory;

filtering the stored samples of the test readback signal through a digital filter with a desired frequency response; and storing the filtered samples of the test readback samples in a table.

14. The method of claim 13 wherein the digital filter is a finite impulse response digital filter.

15. The method of claim 14 wherein the finite impulse response filter is a least squares approximation of the ideal low pass digital filter.

16. The method of claim 7 wherein the step of processing the samples of the test readback signal further comprises:

storing the samples of the test readback signal in a first table inside a memory;

filtering the stored samples of the test readback signal through a first digital filter having a low pass frequency response;

storing the samples of the test readback signal filtered by the first digital filter in a second table;

filtering the samples of the test readback signal stored in the first table through a second digital filter having a band pass frequency response;

storing the samples of the test readback signal filtered by the second digital filter in a third table; and combining the samples of the test readback signal from the second table and the third table in a predetermined manner to determine the operating tape tension value.

17. The method of claim 7 wherein the method for adjusting the tension of the tape in the tape drive is first performed on a track with the tape moving in one direction to determine a forward value of the operating tape tension, and then repeated on a separate track with the tape moving in the backward direction to determine a backward value of the operating tape tension; the forward operating tape tension being implemented when the tape is advanced in the forward direction, and the backward operating tape tension being implemented when the tape is advanced in the backward direction.

18. The method of claim 7 wherein the method for adjusting the tension of the tape in the tape drive is performed on each track of a multiple channel tape drive, the operating tape tension for the tape drive being implemented based upon the selection from the set of operating tape tension values obtained for each track.

19. An apparatus for adjusting the tension of a tape in a tape drive by control of the motor means thereof, the apparatus comprising:
 means for receiving the tape;
 means for providing a test signal;
 means for recording test information from the test signal onto the tape while tape tension is concurrently varied in value in a prescribed manner;
 means for immediately reading the test information to obtain a test readback signal;
 means for processing the test readback signal to determine a functional relationship between the test readback signal and the tape tension;
 means for computing the value of an operating tape tension based upon the functional relationship between the test readback signal and the tape tension; and
 means for controlling the motor means of the tape drive for implementing the operating tape tension in the form of a command signal.

20. The apparatus of claim 19 comprising means for preparing a designated scratch area on the tape prior to recording the test signal.

21. The apparatus of claim 19 comprising means for varying the tape tension as a function of time.

22. The apparatus of claim 21 comprising means for superimposing a periodic disturbance on the tape tension varied as the function of time.

23. An apparatus for providing drive signals to first and second motor means of a tape drive for adjusting the tape tension to compensate for changes in ambient conditions as well as variation in physical and functional characteristics of the tape drive and the tape, the apparatus comprising
 means for receiving a tape into the tape drive;
 means for preparing a designated scratch area on the tape by erasing the designated scratch area on a first track with a pre-selected write signal by means of a forward write transducer while the tape is moving in the forward direction;
 means for erasing the designated scratch area on a second track with a pre-selected write signal by means of a backward write transducer;
 means for providing a test signal of known parameters for recording test information onto the scratch area of the first track with the tape moving in the forward direction;
 means for immediately reading the thus recorded test information for obtaining a test readback signal by means of a read transducer;
 means for sampling the test readback signal;
 means for processing the samples of the test readback signal to generate a table of the readback amplitude values versus the tape tension values;
 means for varying the tape tension in a predetermined manner by supplying appropriate current commands to the first motor means and the second motor means;
 means for determining a reference readback signal amplitude value;
 means for determining an operating tape tension value with reference to the thus determined reference readback signal amplitude value; and
 means for controlling the current commands to the first motor means and the second motor means in response to the thus determined operating tape tension value for controlling the tape tension in the tape drive.

24. The apparatus of claim 23 wherein the means for determining the reference readback signal amplitude value further comprises:
 means for searching through the table of the readback amplitude values versus the tape tension values to determine the maximum readback signal amplitude;
 means for calculating a base amplitude value equal to a predetermined portion of the maximum readback signal amplitude; and
 means for finding a readback amplitude value in the table matching the base amplitude value.

25. The apparatus of claim 23 wherein the means for determining the operating tape tension value further comprises:
 means for locating within the table of the readback amplitude values versus the tape tension values a base tape tension value corresponding to the readback amplitude value matching the base amplitude value; and
 means for adding a predetermined offset to the base tape tension value to determine the operating tape tension value.

26. The apparatus of claim 23 wherein the means for processing the samples of the test readback signal further comprises:
 means for storing the samples of the test readback signal in a table inside a memory;
 means for filtering the stored samples of the test readback signal through a digital filter with a desired frequency response; and
 means for storing the filtered samples of the test readback samples in a table.

27. The apparatus of claim 23 wherein the means for processing the samples of the test readback signal further comprises:
 means for storing the samples of the test readback signal in a first table inside a memory;
 means for filtering the stored samples of the test readback signal through a first digital filter having a low pass frequency response;
 means for storing the samples of the test readback signal filtered by the first digital filter in a second table;
 means for filtering the samples of the test readback signal stored in the first table through a second digital filter having a band pass frequency response;
 means for storing the samples of the test readback signal filtered by the second digital filter in a third table; and
 means for combining the samples of the test readback signal from the second table and the third table in a predetermined manner to determine the operating tape tension value.

* * * * *